United States Patent
Schumann et al.

(10) Patent No.: US 10,065,516 B2
(45) Date of Patent: Sep. 4, 2018

(54) DEVICE FOR INDUCTIVELY CHARGING AN ELECTRICAL STORAGE UNIT

(71) Applicant: Robert Bosch GmbH, Stuttgart (DE)

(72) Inventors: Philipp Schumann, Stuttgart (DE); Juergen Eckhardt, Markgroeningen (DE); Oliver Blum, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 15/323,170

(22) PCT Filed: Jun. 22, 2015

(86) PCT No.: PCT/EP2015/063904
§ 371 (c)(1),
(2) Date: Dec. 30, 2016

(87) PCT Pub. No.: WO2016/000991
PCT Pub. Date: Jan. 7, 2016

(65) Prior Publication Data
US 2017/0158065 A1 Jun. 8, 2017

(30) Foreign Application Priority Data
Jul. 2, 2014 (DE) .................. 10 2014 212 842

(51) Int. Cl.
*H02J 7/00* (2006.01)
*B60L 11/18* (2006.01)
*H02J 7/02* (2016.01)

(52) U.S. Cl.
CPC ............ *B60L 11/182* (2013.01); *H02J 7/025* (2013.01)

(58) Field of Classification Search
CPC . H02J 7/025; H02J 50/10; H02J 50/12; B60L 11/182
See application file for complete search history.

(56) References Cited

U.S. PATENT DOCUMENTS 6,150,794 A    11/2000  Yamada et al.
2014/0139036 A1*  5/2014  Shijo ............... H02J 17/00
                                                       307/104

FOREIGN PATENT DOCUMENTS

| CN | 103532249 A | 1/2014 | |
| DE | 102007014712 | 12/2007 | |
| DE | 102007014712 A1 * | 12/2007 | ......... H01F 27/2847 |
| DE | 102008064710 B4 | 4/2013 | |
| WO | 2013183105 | 12/2013 | |

OTHER PUBLICATIONS

International Search Report for Application No. PCT/EP2015/063904 dated Nov. 2, 2015 (English Translation, 4 pages).

* cited by examiner

*Primary Examiner* — David V Henze-Gongola
(74) *Attorney, Agent, or Firm* — Michael Best & Friedrich LLP

(57) ABSTRACT

The invention relates to a device (1) for inductively charging an electrical storage unit, in particular of a motor vehicle, comprising a stationary primary coil (2) and a secondary coil that is or can be associated with the motor vehicle, wherein at least one resonance capacitor (7) is associated with the primary coil (2) and the secondary coil, respectively. According to the invention, at least one of the resonance capacitors (7) is designed to at least substantially surround the coil (2) in question or to at least substantially be surrounded by the coil (2) in question.

10 Claims, 7 Drawing Sheets

DEVICE FOR INDUCTIVELY CHARGING AN ELECTRICAL STORAGE UNIT

BACKGROUND OF THE INVENTION

The invention relates to a device for inductively charging an electrical storage unit, in particular of a motor vehicle, comprising a stationary primary coil and a secondary coil that is or can be associated with the motor vehicle, wherein at least one resonance capacitor is associated with the primary coil and the secondary coil, respectively.

TECHNICAL FIELD

Devices of the type mentioned above are known from the prior art. In the case of devices for inductive loading of electric vehicles of hybrid vehicles, the energy required for charging a vehicle battery is not transmitted via a charging cable to the vehicle (conductive charging) but via a transformer having a large air gap. In so doing, a primary coil of the transformer is typically is either embedded into the pavement of the street or designed as a charging plate applied to the pavement and connected to a grid by means of suitable electronics. The secondary coil of the transformer is typically fixedly mounted in the underbody of the vehicle/motor vehicle and in turn connected to the vehicle battery by means of suitable electronics. In order to transmit the energy, the primary coil generates a high frequency, magnetic alternating field, which penetrates mthe secondary coil and induces a corresponding current there. An inverter is provided on the primary side for the induction, said inverter being operated with a high switching frequency. In order not to have to transmit a reactive power across the air gap, a resonantly operated oscillating circuit is built. This consists of the inductance of the primary coil and a capacitance of a correspondingly selected resonance capacitor. On the secondary side, an oscillating circuit is also configured from the secondary coil and the resonance capacitor. Both oscillating circuits are set to the same resonance frequency and operated with the same, so that only negligible reactive powers accrue outside of the transmission network formed in this manner.

The components of the respective side are typically distributed such that a primary electronics unit and a primary coil as well as a secondary coil and a secondary electronic unit are in each case integrated. In so doing, the aforementioned resonance capacitors are typically accommodated in the respective electronic unit.

SUMMARY OF THE INVENTION

The device according to the invention has the advantage that cable connections within the resonance circuit or respectively between the primary coil and/or the secondary coil and the respective resonance capacitor can be eliminated. The resonance capacitors are compactly disposed with the respective coil such that advantages with regard to installation space additionally result and the requirements for current carrying capacity, insulating ability and screening from individual cables can be eliminated or at least reduced. To this end, provision is made according to the invention for at least one of the resonance capacitors to be designed to therefore at least substantially surround the primary coil or the secondary coil. According to the invention, the resonance capacitor is not only associated with the respective coil but also designed to surround the same; thus enabling the resonance capacitor to extend around the respective coil. Alternatively, provision is made according to the invention for the at least one resonance capacitor to at least substantially be surrounded by the coil in question. In this case, the resonance capacitor therefore does not surround the coil but the coil said resonance capacitor; thus enabling the latter to lie within the coil. To this end, the coil expediently has a corresponding recess or respectively receptacle, in which the resonance capacitor can be inserted. As a result, the resonance capacitor is directly integrated into the respective coil or into a housing that accommodates the coil.

Provision is made according to an advantageous modification to the invention for the respective resonance capacitor to be adapted in the form thereof to the coil associated with said capacitor. As a result, a particularly compact unit consisting of coil and resonance capacitor is provided having an advantageous vibration behavior.

Provision is made according to an advantageous modification to the invention for the respective resonance capacitor to be designed as a film capacitor. In this case, the resonance capacitor has a plurality of films produced on a winding carrier, which, for example, can be wound in a circular or square manner so as to lie on top of each other. In so doing, any coil-winding geometry can be easily emulated by means of the shape of the winding carrier. According to an advantageous method for producing the device according to the invention, provision is made for the winding carrier to already have the shape of the resonance capacitor to be produced. As a result, the resonance capacitor can be manufactured in the desired geometry, in particular tailored to the respective coil, by winding the films.

Provision is furthermore preferably made for the respective resonance capacitor to be disposed together with the coil associated therewith in a common housing. In so doing, compact coil units result, in particular a primary unit comprising the primary coil and the resonance capacitor associated with said primary coil and/or a secondary unit comprising the secondary coil and the resonance capacitor associated with said secondary coil. As a result of the common housing, the units can be easily handled and be disposed on a street pavement or respectively on the underbody of a vehicle.

Provision is furthermore preferably made for contact connections of the respective resonance capacitor to form a coil winding, which is of the same or opposite polarity compared to the winding of the associated coil. In terms of the opposite configuration of the coil winding, an opposite current flow direction is to be understood during operation. The contact surfaces of the respective resonance capacitor can, for example, constitute an outer coil winding, the current flow of which occurs oppositely to the remaining coil windings of the secondary coil or primary coil; thus enabling an interfering stray magnetic field to be partially eliminated. As a result, an auxiliary magnetic field is produced, which correspondingly contributes to the formation of the magnetic field of the primary coil or the secondary coil in a suitable manner.

Provision is furthermore preferably made for at least one screening element to be associated with the respective resonance capacitor and the coil associated therewith. The screening element is particularly used to screen and guide the magnetic field generated by the respective oscillating circuit. The screening element is preferably manufactured from ferrite or other suitable materials.

In a particularly preferred manner, the screening element is designed as a screening plate. The screening plate can thereby extend parallel to the charging plate of itself form the charging plate. The screening plate is preferably used simultaneously as a support element for the respective coil and the resonance capacitor. The coil and its associated resonance capacitor are preferably held or locked to the screening plate.

The respective coil and the resonance capacitor associated therewith are preferably disposed together on one side of the screening plate. As a result, the screening plate can particularly be used as the charging plate.

Provision is alternatively made in a preferred manner for some sections of the screening plate to run between the resonance capacitor and the respective coil. In so doing, the annular capacitor can, for example, can be disposed so as to be spatially separated from the secondary coil or the primary coil.

According to an advantageous modification to the invention, provision is furthermore made for the respective resonance capacitor to comprise at least two capacitors. The resonance capacitor is particularly made of two capacitors having doubled capacity and half dielectric strength in order to limit a voltage transfer in the respective coil with respect to ground, to achieve a symmetric design and to achieve a galvanic separation of the respective coil windings with respect to the energy source, in particular with respect to a high-voltage battery of the motor vehicle.

BRIEF DESCRIPTION OF THE DRAWINGS

The invention is described below in greater detail using an exemplary embodiment. In the drawings.

DETAILED DESCRIPTION

Figure 1:
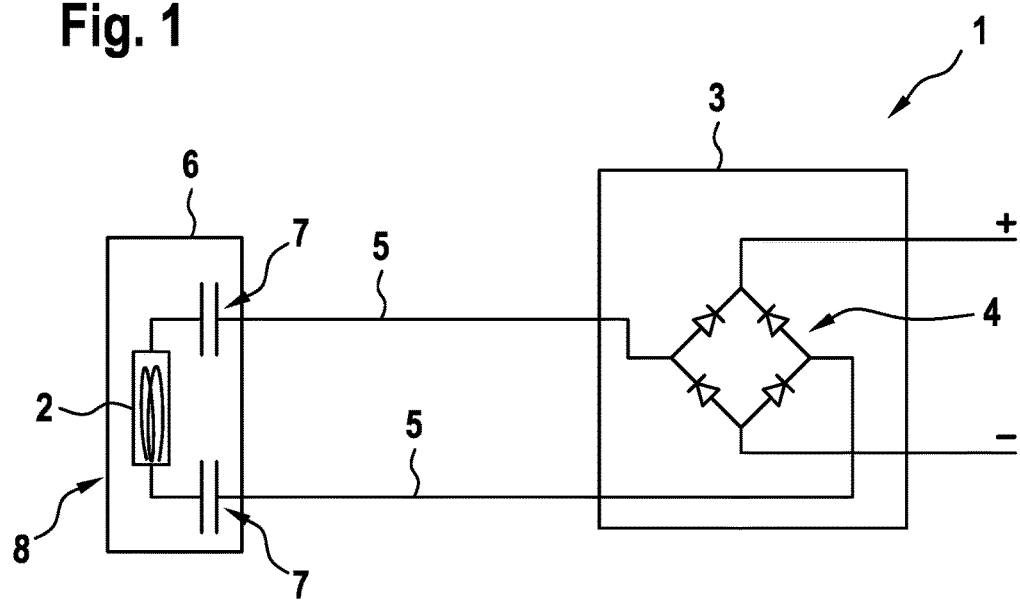
FIG. 1 shows a simplified circuit diagram of an advantageous device for inductively charging an electrical storage unit.

In a simplified depiction, FIG. 1 shows a circuit diagram of a device for inductively charging an electrical storage unit. The circuit diagram shows a primary coil 2, which is or can be connected to an energy source, in particular a power supply system or grid, by means of an electronic unit 3. To this end, the electronic unit 3 comprises an inverter 4 that can be operated with a high switching frequency. The electronic unit 3 is connected to the primary coil 2 by means of a cable 5. The primary coil 2 is disposed in a housing 6, in which a resonance capacitor 7 is also provided. The resonance capacitor 7 corresponds in the shape thereof to the shape of the coil winding of the primary coil 2, as will be explained below in greater detail. The primary coil 2 and the resonance capacitor 7 together form a primary unit 8 of the device 1. A secondary unit that is not depicted here and comprises a secondary coil and a resonance capacitor is preferably constructed corresponding to the primary unit 8.

Figure 2A:
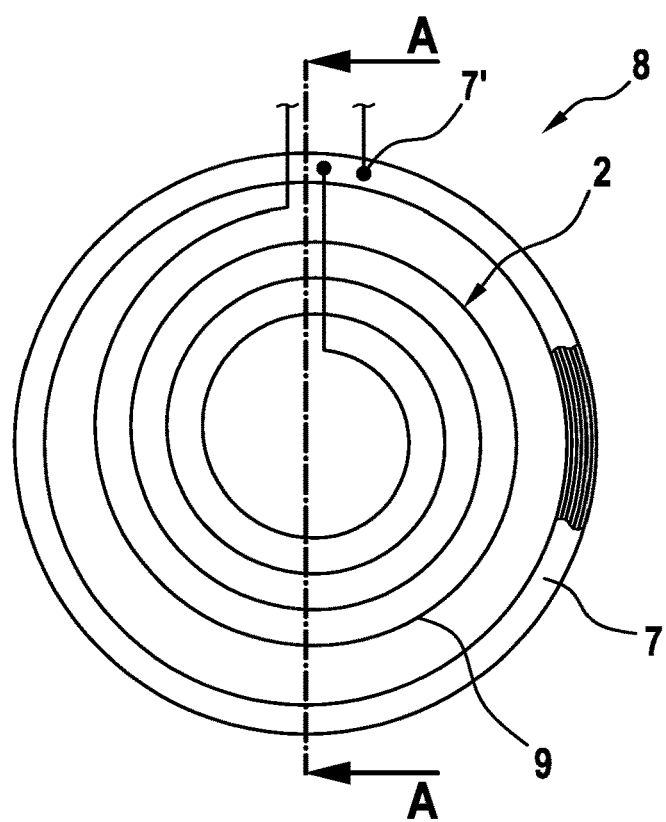
FIGS. 2A and 2B show a primary unit of the device in different depictions.
Figure 2B:
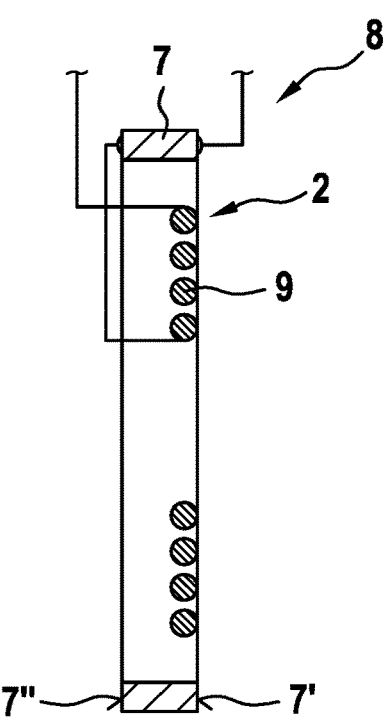

For this purpose, FIG. 2 shows the primary unit 8, which is formed by the primary coil 2 and the resonance capacitor 7, in various depictions. FIG. 2A shows the primary unit 8 in a top view, and FIG. 2B shows said primary unit in a cross-sectional depiction along the line A-A from FIG. 2A.

It can particularly be seen in FIG. 2A that coil windings 9 of the primary coil 2 run circularly or respectively spirally and that the resonance capacitor 7 likewise circularly surrounds the coil windings 9. Contact surfaces 7' and 7" of the resonance capacitor, as can particularly be seen in FIG. 2B, can be electrically contacted in order, on the one hand, to contact the coil and, on the other hand, to contact the electronic unit 3.

The resonance capacitor 7 is designed as a film capacitor comprising a plurality of layers lying on top of one another. The shape of the resonance capacitor 7 can be easily achieved by means of a corresponding shape of a winding carrier during the manufacture of the resonance capacitor. By means of the configuration as a film capacitor, virtually any shape of the resonance capacitor can be implemented in a simple and cost effective manner. The primary coil 2 and the resonance capacitor 7 are accommodated in the common housing 6 and thereby contacted to one another internally in the housing so that no resonance circuit-internal cable connections have to be led outside of the housing 6. By means of the large surface that is then available to the resonance capacitor 7, said resonance capacitor 7 can be thermally discharged substantially easier and, as the case may be, can be cooled only passively.

At the same time, a comparatively large installation space can be saved in the electronic unit 3, and the electronic unit 3 can also be accommodated removed from the housing 6 in a vehicle or on a roadway because only the battery voltages and battery charging currents accrue in the connection cable 5 between housing 6 and electronic unit 3. Provision is particularly made for the housing 6 to form a charging plate, which can be mounted on a roadway or to the underbody of the vehicle.

A further advantage of the device 1 is that reduced total costs accrue because a separate housing for the resonance capacitor 7 is eliminated. In a preferred manner, the usual grouting that is already available in the coil plate structure can simultaneously be used as capacitor insulation.

The current carrying contact surface 7' and 7" of the resonance capacitor 7 are preferably constructed such that the magnetic field forming by means of their current flow contributes in a suitable manner to the formation of the magnetic field of the primary coil 2. Provision is preferably made for the contact surfaces 7', 7" of the capacitor 7 to form an outer coil winding, the current flow of which takes place oppositely to the remaining coil windings so that a partial elimination of the magnetic field of the primary coil 2 results.

As can be seen in FIG. 2A, the resonance capacitor 7 is preferably designed as a ring capacitor so that the contact surfaces 7', 7" of the resonance capacitor 7 lie parallel to the drawing plane of FIG. 2A. For the purpose of contacting, the resonance capacitor 7 must therefore be connected on "top" and "bottom" as in the cross-sectional view of FIG. 2B.

FIGS. 3A to D show various exemplary embodiments of the unit 8 which is complemented by a screening element 10, in each case in a cross-sectional view. The screening element 10, which is particularly made from or comprises ferrite, is used to guide and screen the generated magnetic field or fields. In connection with the integration of the annular resonance capacitor 7, various arrangements between ferrite and screening, resonance capacitor 7 and primary coil 2 are possible.

Figure 3A:
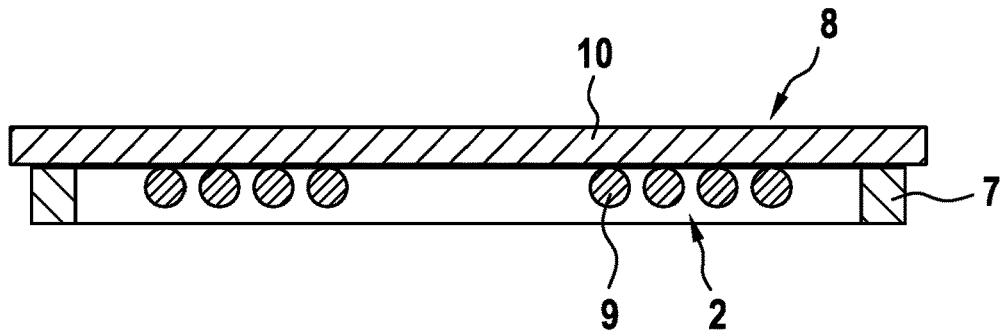
FIGS. 3A to 3D show different embodiments of the primary unit comprising a screening element.

According to FIG. 3A, provision is made for the resonance capacitor 7 to be disposed together with the primary coil 2 on one side of the screening element 10.

Figure 3B:
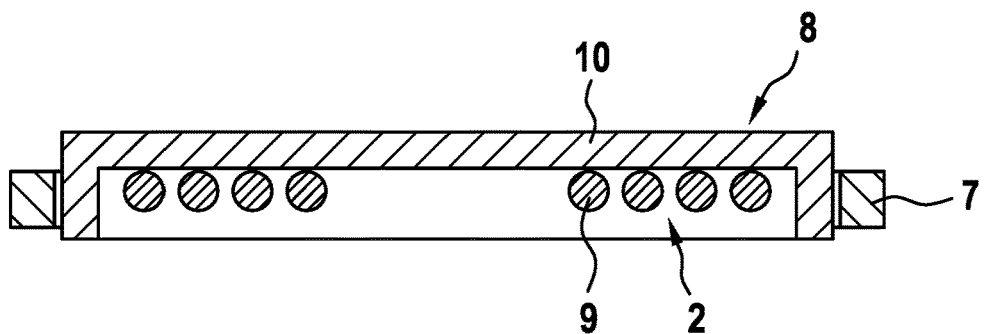

According to FIG. 3B, provision is made for the screening element to be designed cup-shaped; wherein the primary coil 2 is arranged within the screening element 10, whereas the resonance capacitor surrounds the lateral wall of the screening element 10 on the outside.

Figure 3C:
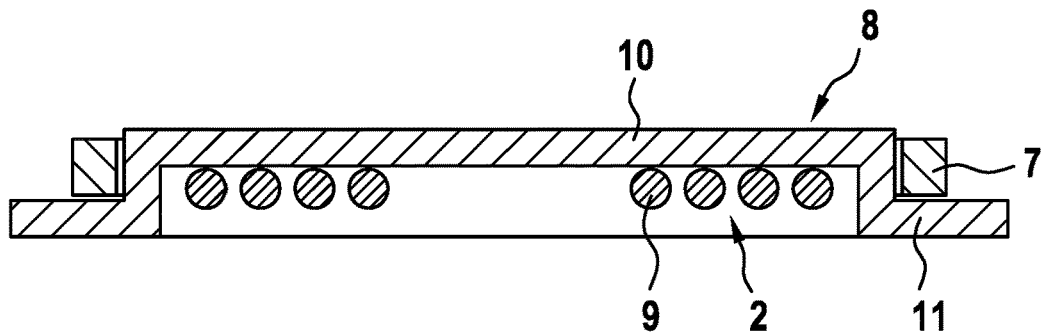

According to FIG. 3C, provision is made for the screening element 10 to be designed cup-shaped with a projection 11; thus enabling the primary coil 2 to be disposed within the screening element 10, and the resonance capacitor 7 bears on the outside against the projection.

Figure 3D:
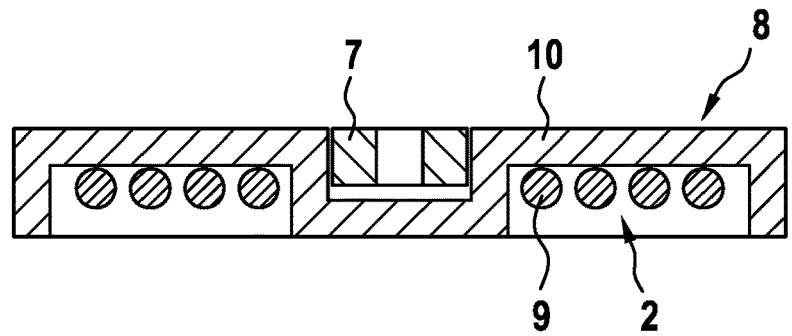

According to FIG. 3D, provision is made for the resonance capacitor 7 to not surround the primary coil 2, but for the primary coil 2 to surround the resonance capacitor 7. To this end, the primary coil 2 has a recess or respectively receptacle in the middle thereof, in which the resonance capacitor 7 is at least in part inserted, as is shown in FIG. 3D. For this purpose, the screening element 10 has an indentation in the middle thereof, in which the resonance capacitor 7 lies.

Figure 4:
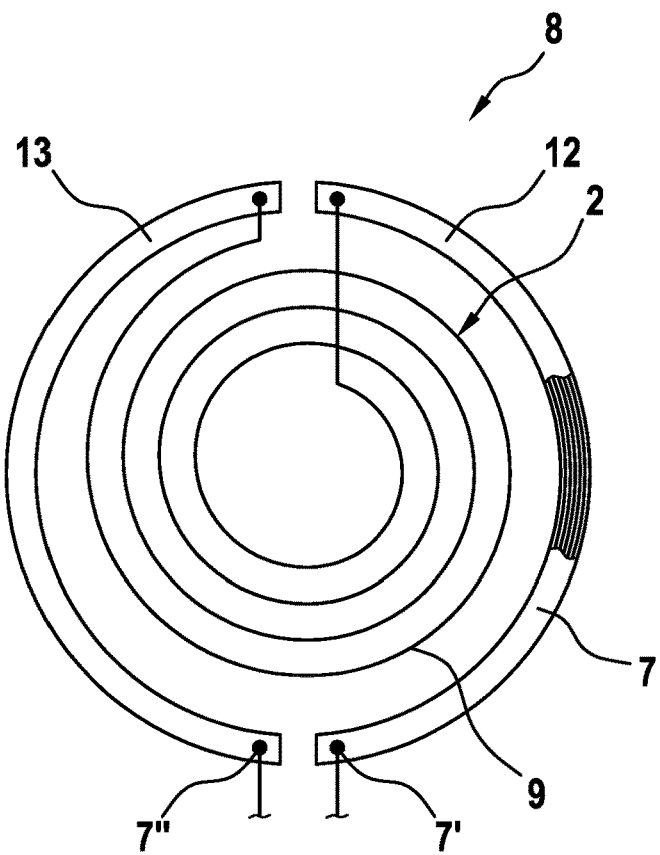
FIG. 4 shows a further exemplary embodiment of the primary unit in a top view.

In order to limit excess voltages in the primary coil 2 with respect to ground, to achieve a symmetrical configuration and to achieve a galvanic separation of the coil windings 9 with respect to a high-voltage battery of the vehicle, the resonance capacitor 7 is divided into two capacitors 12, 13 having doubled capacity but half of the dielectric strength, which is shown by way of example in FIG. 4. The capacitors 12, 13 are thereby designed in a semi-annular shape and connected at one end to the coil 2 and at the other end to the electronic unit 3.

Various geometries of the resonance capacitor 7 and the coil windings 9 are conceivable. Because the housing 6 or respectively the charging plate in the vehicle integration frequently has a rectangular contour, a rectangular resonance capacitor 7 can be advantageous in order, for example, to increase the distance to the coil winding and thus reduce interference by the coil magnetic field.

Figure 5A:
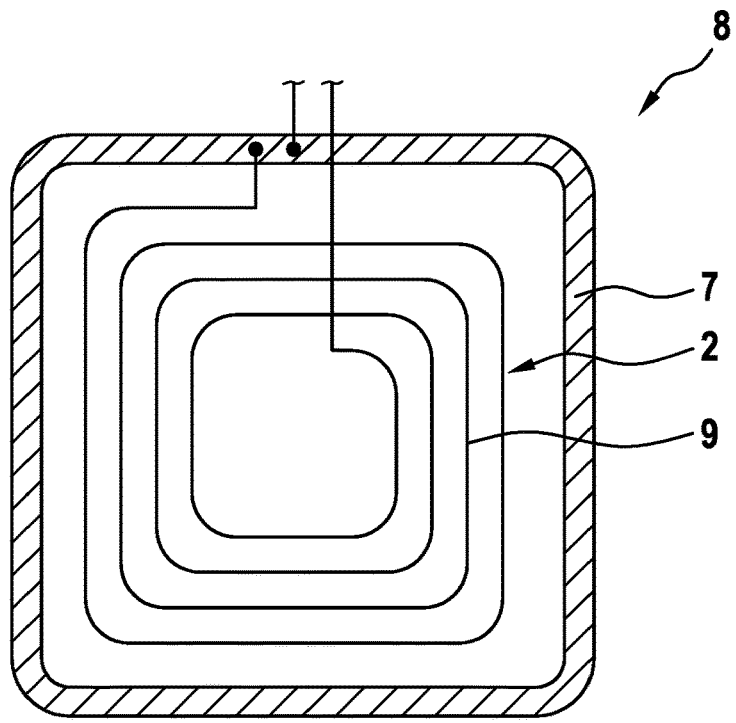
FIGS. 5A to 5D show different configurations of the primary unit.
Figure 5B:
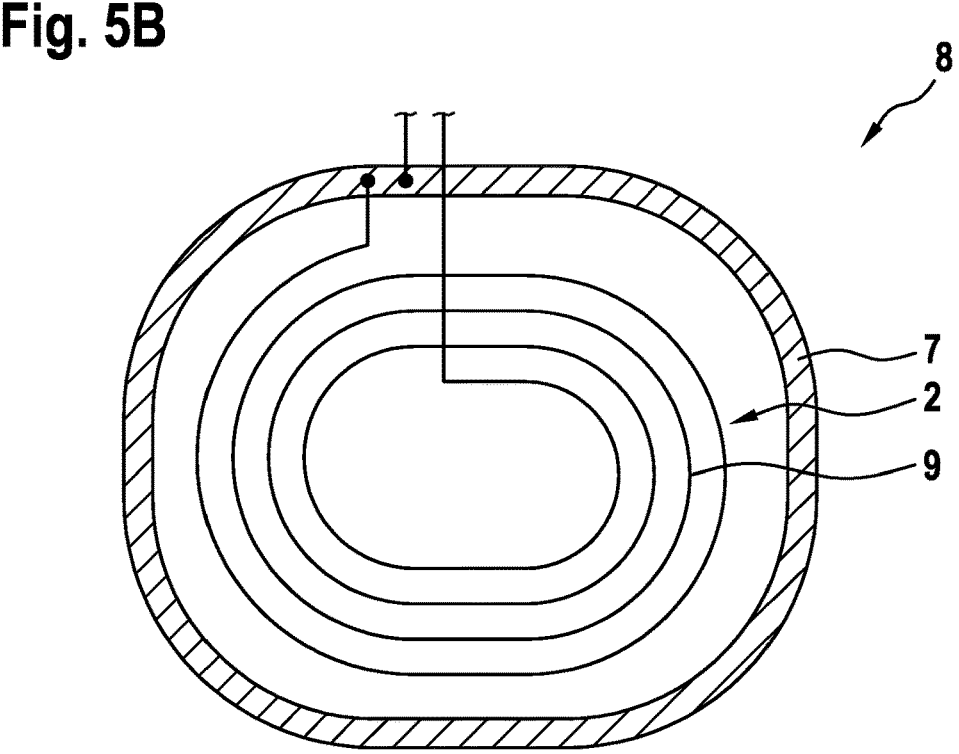
Figure 5C:
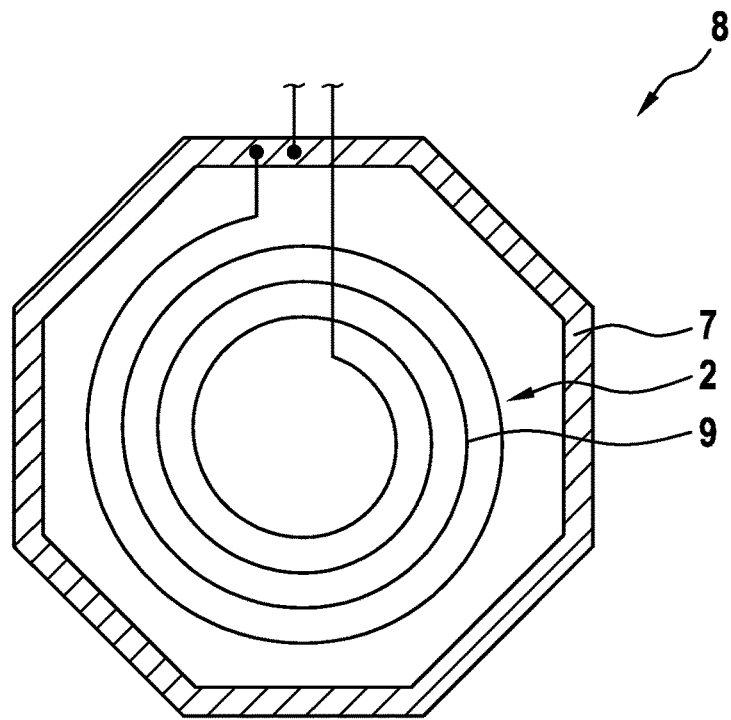
Figure 5D:
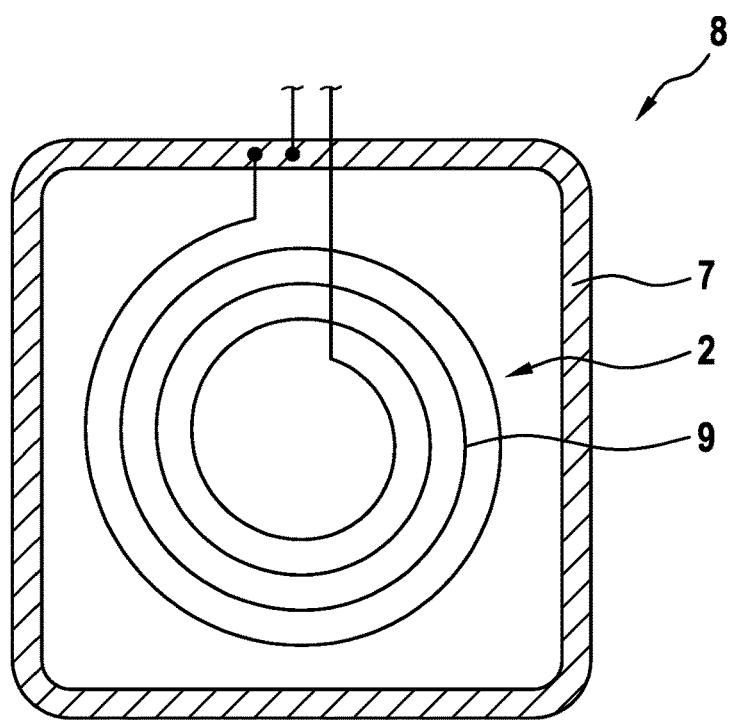

FIG. 5A to D show various exemplary embodiments of the primary unit 8. FIG. 5A shows the primary unit 8 having a square contour, FIG. 5B having an oval-shaped contour, FIG. 5C having an octagonal contour and FIG. 5D having a square contour of the resonance capacitor 7 and a circular or respectively spiral shape of the primary coil 2. FIGS. 5C and D make clear that the resonance capacitor 7 in the shape thereof does not absolutely have to conform to the shape of the primary coil 2. The described exemplary embodiments of FIGS. 5A to D apply equally for an arrangement in which the resonance capacitor 7 is surrounded by the primary coil 3 as is shown in FIG. 3D. Also in this case, the resonance capacitor can, for example, have a square or rectangular shape or respectively contour, which preferably corresponds to the shape or respectively contour of the primary coil 2; however, can also deviate from the same.

Figure 6:
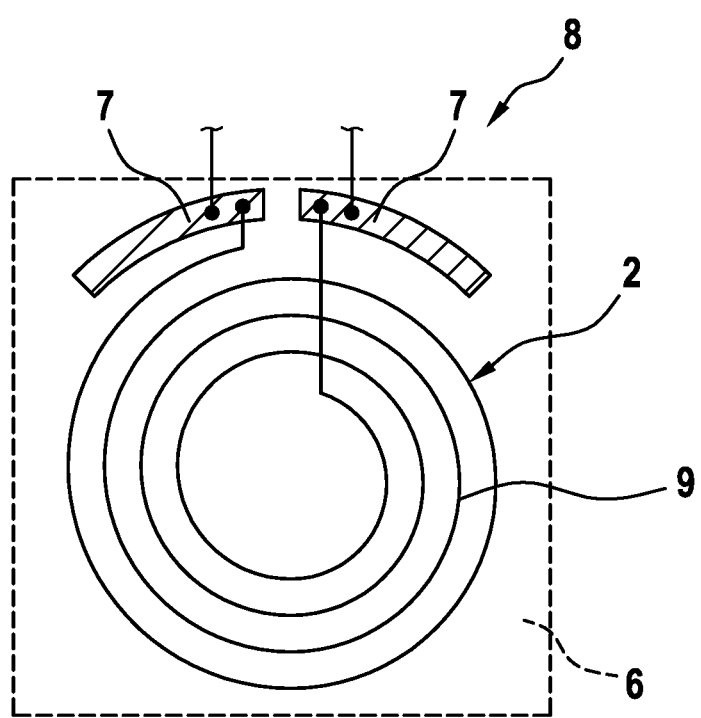
FIG. 6 shows a further exemplary embodiment of the primary unit.

It is also conceivable to use only ring pieces of the resonance capacitor 7 in order to achieve a particularly small space requirement of the housing 6 or the charging plate, as is shown by way of example in FIG. 6. The outer contour of the housing is indicated here with a dashed line. The embodiments mentioned above preferably apply—as already stated above—likewise to the secondary unit of the inductive charging system.

The invention claimed is:

1. A device for inductively charging an electrical storage unit comprising a stationary primary coil (2) and a secondary coil that is connected with the electrical storage unit and at least one resonance capacitor (7) connected with the primary coil (2) and the secondary coil, respectively, wherein at least one of the resonance capacitors (7) is configured to surround the coil (2) in question or be surrounded by the coil (2) in question, further characterized in that contact connections (7', 7") of the respective resonance capacitor (7) form a coil winding, which has the opposite polarity or the same polarity compared with the winding of the connected coil.

2. The device according to claim 1, characterized in that the resonance capacitor (7) has the form of the coil (2) in question.

3. The device according to claim 1, characterized in that the respective resonance capacitor (7) is a film capacitor.

4. The device according to claim 1, characterized in that the respective resonance capacitor (7) is disposed together with the coil (2) connected therewith in a common housing (6).

5. The device according to claim 1, characterized in that at least one screening element (10) is connected with the respective resonance capacitor (7) and the connected coil (2).

6. The device according to claim 5, characterized in that the screening element (10) is a screening plate.

7. The device according to claim 6, characterized in that the resonance capacitor (7) and the connected coil (2) are disposed on one side of the screening plate.

8. The device according to claim 6, characterized in that some parts of the screening plate lie between the resonance capacitor and the connected coil (2).

9. The device according to claim 1, characterized in that the respective resonance capacitor (7) comprises two capacitors (12, 13).

10. The device according to claim 1, wherein the electrical storage unit is a motor vehicle.

* * * * *